Aug. 26, 1947.                    C. P. CARLSON ET AL                    2,426,177
                                   ELECTRICAL RESONATOR
                                   Filed June 10, 1944                   2 Sheets-Sheet 1
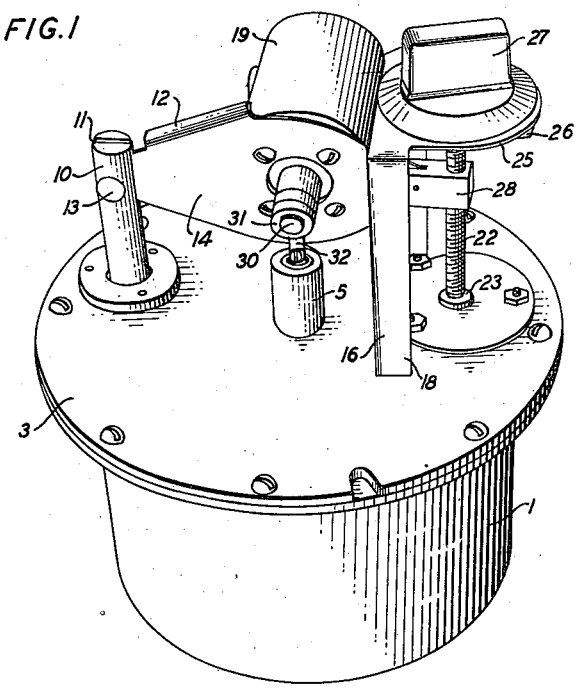
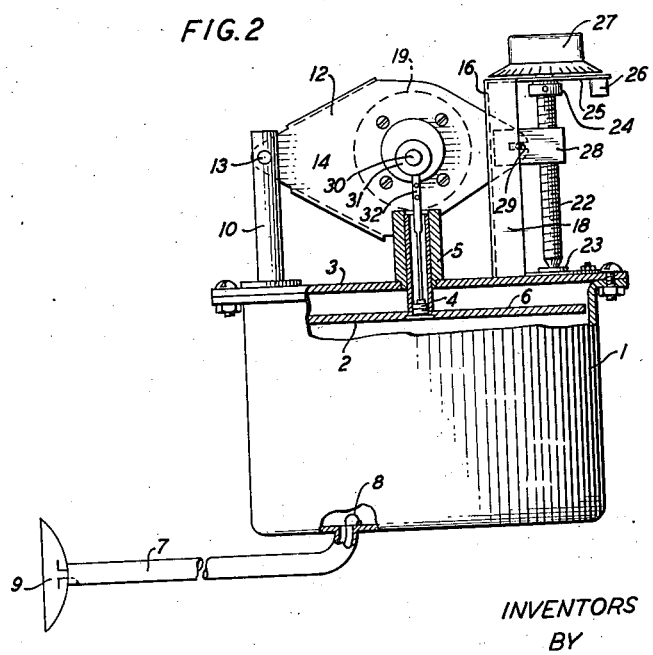
INVENTORS
C. P. CARLSON
R. W. CHESNUT
A. D. KNOWLTON
BY
ATTORNEY Patented Aug. 26, 1947

2,426,177

UNITED STATES PATENT OFFICE 2,426,177

ELECTRICAL RESONATOR

Carl P. Carlson, Tenafly, Roy W. Chesnut, Upper Montclair, and Alfred D. Knowlton, Summit, N. J., assignors to Bell Telephone Laboratories, Incorporated, New York, N. Y., a corporation of New York Application June 10, 1944, Serial No. 539,668

5 Claims. (Cl. 178—44)

This invention relates to electrical resonators and more particularly to electrical resonators of the closed resonance chamber type with motor-driven tuning apparatus.

An object of the invention is to free an electrical resonance chamber having a motor-driven tuner from extraneous vibrations occasioned by the motor or the tuner.

Another object of the invention is to provide a support for the motor of the motor-driven tuner which will permit ready adjustment of the central position of the tuner.

A further object of the invention is to support the motor of a motor-driven tuner in such manner as to eliminate undesirable vibrations which may result in extraneous oscillations of the electrical resonator with which the tuner is associated.

A further object of the invention is to so mount the motor of a motor-driven tuner apparatus as to preclude deflections from the position which it should occupy at the middle of its tuning cycle.

Electrical resonators having motor-driven tuners are used in the centimeter wavelength range for testing high frequency transmission systems to ascertain the frequency and effectiveness of transmitters and to tune receivers to such transmitters. They operate by virtue of the fact that such resonators have extremely high selectivity and may continue to build up internal electrical fields over a relatively long period of excitation. The field built up is a function of the frequency and the wave form of the exciting transmitter. Upon cessation of the exciting force the field within the resonator may serve as a source of echoed or retransmitted waves and the duration of echo intensity above a given minimum is an index of the magnitude of the field. If the "echo" waves are picked up by the receiver which it is desired to tune, the duration of the receiver response also is a measure of the effectiveness of the entire system under test and hence of the frequency alignment of the receiver with the transmitter and the electrical resonator.

Since the resonator selectivity is so very high, it is readily possible for the transmitter and the resonator to fall out of resonance agreement. This is particularly likely to occur in the case of airborne apparatus in which rapid changes of temperature may be encountered. To avoid the necessity of adjusting the resonator during flight the tuning of the resonator is varied rapidly back and forth over a limited frequency range sufficient to include the frequency of the transmitter so that frequency agreement of the transmitter and resonator and a response of an indicator energized by the field of the resonator will be had at least once and, in general, twice in each tuning cycle of the resonator.

In accordance with the present invention, tuning of the electrical resonator is accomplished by a movable element such as a reciprocating piston driven through a motor-operated eccentric and crank connection. The motor is supported on an end of the electrical resonator structure by a frame so constructed as to permit moving the motor toward or away from the resonator to adjust the central tuning frequency of the variable frequency range. The frame is constituted by elements having high rigidity and stiffness in direction in which deflections may tend to occur and it distributes the stresses over a relatively large base area thus minimizing deflections and undesirable vibrations.

Referring to the drawing:

Fig. 1 shows in perspective an embodiment of the invention;

Fig. 2, a side view of the apparatus of Fig. 1, partly in section and with a coaxial line connection to a pick-up element;

Figure 3:
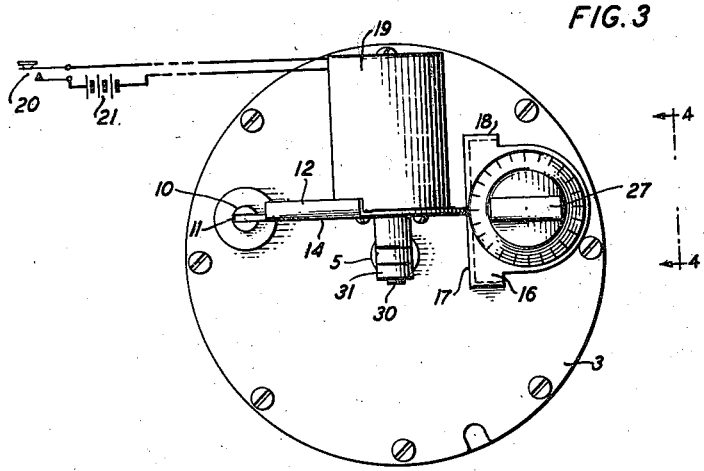
Fig. 3 shows a top plan view of the structure of Figs. 1 and 2.
Figure 4:
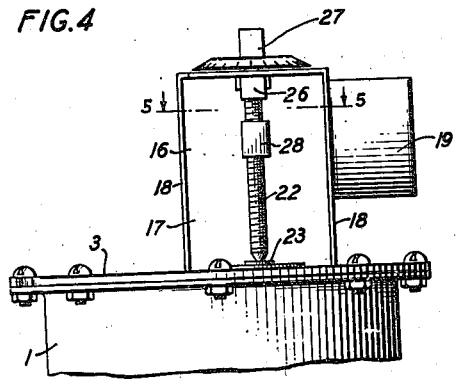
Fig. 4 is an elevation of the upper portion of the structure of Fig. 3, viewed in the direction of the arrows 4—4.

The electrical resonator comprises a cup-shaped chamber 1 preferably of copper, aluminum or other electrically conducting material. If stable mechanically and thermally it may consist of any material whatever provided it have an internal coating 2 of silver or other substance of high electrical conductivity. The chamber 1 is closed at its upper end by a circular cover plate 3 which may be connected by screws or bolts to the chamber 1. Extending centrally through cover 3 is a piston rod 4 which fits nicely in a guideway 5 fixedly mounted on the cover 3 and supports at its lower end a piston 6 fitting rather loosely within the chamber 1 and also provided on its inner, that is, lower surface with the coating 2 of highly conductive substance.

Electrical energy may be introduced into or transferred from the resonator 1 by a coaxial circuit 7, one terminal of which is coupled to the internal field of the chamber by a loop coupler 8 in well-known manner and the other terminal of which is connected to a radiator or absorber which may take the form of a dipole 9.

Figure 5:
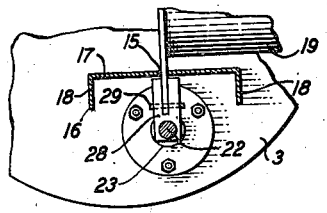
Fig. 5 is a section made by a horizontal plane passing through the line 5—5 of Fig. 4.

The range of tuning which is desirable may be of the order of 5 percent of the mean frequency. The piston 6 should therefore be designed for a travel which will insure coverage of that range. It is very desirable also to be able to set the mean position of the piston 6 at a given resonance frequency. The piston 6 is supported through a framework physically connected to the upper surface of cover plate 3. A circular upright post 10 spaced widely from the guideway 5 is provided with a vertical slot 11 as indicated in Fig. 3, in which one end of a laterally extending frame member 12 is hinged at the pivot 13. Frame member 12 has a central flat web portion 14 extending in a vertical plane, the web portion being comparatively wide and rigid against sagging or deflection in a vertical direction. The end of member 12 remote from the hinge passes through a slot 15 (see Fig. 5) in an upstanding U or channel-shaped column 16 which has a wide central web 17 and marginal stiffening flanges 18. The member 12 serves to support a small electrically driven motor 19 which may be operated by remote control through a circuit closer 20 and source 21 of electrical energy in circuit therewith.

Column 16 with its broad web 17 and its narrow slot 15 holds frame member 12 against torsion deformation and lateral buckling. The position of member 12 is adjustable by means of a manually controlled screw 22 which is held in position against an abutment 23 by a collar 24 fixed on the screw 22 by a pin or set-screw at a point just beneath the horizontal forwardly extending flange 25 of the column 16. The screw 22 passes through the flange 25 and is provided at its upper end with a knob 27 having graduations at its outer periphery to enable resetting to any predetermined position. A spring and ball detent 26 supported by the flange 25 cooperates in well-known fashion with the lower surface of the adjusting head 27 to retain it in the position to which it is manually adjusted. The screw 22 is loosely threaded through and carries an adjusting block 28 in a vertical slot of which the end of frame member 12 rests with its bifurcated tip astride a horizontal pin 29.

Motor 19 is provided with an eccentric 30, an eccentric strap 31 and a flat strap connector 32 to connect the eccentric strap to the lower end of piston rod 4. Accordingly, when the motor is energized the piston rod is impelled in a reciprocating manner to move the tuner piston 6 and hence to vary the frequency of the resonator over a range determined by the throw of the eccentric and about a mid-position frequency determined by the setting of adjusting head 27. Any tendency of the motor to deflect from or toward the resonator is overcome by its broadly based support and the rigidity in a vertical direction of the plate 14. Any tendency to lateral deflection is inhibited by the rigid column 16 with its broad web 17. The hinged frame member 12 is seated rather closely in the slot 15 at its free end and in the corresponding slot 11 of post 10 at its hinged end and is therefore precluded from warping or twisting action. The load imposed by the motor supporting structure is accordingly distributed over an area encompassing the post 10 and the flanges 18 thus largely reducing any tendency toward undesirable vibration or deflection. Moreover, the supporting structure involves principally sheet form elements of relatively low mass.

In operation, energy picked up by the dipole 9 and impressed by the coupling loop 8 causes the electromagnetic field within the chamber 1 to build up to an extent depending upon the wave form of the impressed pulse and upon the frequency agreement of the resonance chamber with the frequency of the incoming energy. Assuming that motor 19 is operating to sweep the resonance frequency of the resonance chamber 1 over a considerable range 30 times during each second it follows that at least once and, in general, twice, during each thirtieth of a second the resonance frequency of the resonance chamber will agree with the frequency of incoming pulses. The field in the chamber 1 will accordingly build up for the duration of the pulses which may be of the order of a microsecond and upon termination of the pulse will yield energy to the dipole 9 to be impressed upon the radio receiver, the tuning of which is to be checked. The receiver will accordingly be subjected to retransmitted or re-echoed energy for a duration depending upon the maximum intensity to which the field within the chamber had built up. Although the tuning of the chamber 1 is changing it will be understood that relative to extremely short pulses of energy and to closely positioned receiving instruments it will behave during the time of frequency agreement substantially as if it were of fixed tuning since the tuning cycle is relatively very great in duration compared with the impulses by which the resonator is excited.

In consequence of the structural arrangement which has been described a rugged device is provided which will permit occasional adjustment when the apparatus is at a ground station and which will require no adjustment during flight. The motor-driven tuner serves to rapidly explore a considerable band of resonance frequencies within which the frequency of the transmitted impulses must fall. Its supports are such that for any position of the eccentric the frequency will be a function of that position and will be substantially free from any effects of vibration or deflection. The smoothly variable frequency characteristic of this apparatus is conducive to more accurate determinations of frequency and of frequency agreement. What is also especially important, the reduction in vibration and deflection tends greatly to prolong the life of the equipment.

What is claimed is:

1. An electrical resonance chamber having electrically conducting boundary surfaces, a movable tuning element therein, a motor connected in mechanical driving relation to the tuning element, a structure physically connected to the exterior of the chamber to support the motor, the supporting structure comprising two broad flat plate elements structurally connected to each other with their principal planes perpendicular to each other and to the external surface of the chamber to which the structure is connected whereby deflection of the motor laterally in either plane or to or from the chamber is resisted, and means on the structure for adjusting the position of the motor toward or away from the chamber.

2. A variable electrical resonator comprising a substantially closed chamber with boundary surfaces of electrically conducting material, a tubular guideway extending through a boundary surface of the chamber, a tuning piston within the chamber, a piston rod connected to the piston and fitting closely within the guideway, two supporting columns mounted on the exterior of the surface each at a relatively considerable distance from the guideway and in opposite directions therefrom, a frame member hinged at one end at a point on one column and having its other end slidably supported by the second column, means for varying the position of the slidably supported end, a motor mounted on the frame member and having an eccentric and crank connection to the piston rod to drive the piston in a reciprocating manner.

3. An electrical resonator comprising a chamber having boundaries of electrically conducting material, one end of the chamber consisting of a removable cap, a guideway extending through a central portion of the cap to permit reciprocation of a piston rod passing through the guideway, a pair of supports on the outer side of the cap and diametrically opposite from each other with respect to the guideway, a frame hinged at one end on one of the supports and provided near its other end with an adjustable connection to the other support, a motor mounted on the support and having a rotatable shaft, means connecting the shaft to the piston rod to drive it reciprocally and a tuning piston connected to the piston rod on the inner side of the removable cap.

4. A cylindrical resonator having an end wall provided with a central guideway opening, a supporting post mounted on the exterior of the end wall and having a longitudinal slot parallel to a plane passing through the guideway, a supporting column also mounted on the end wall in a region opposite the post and also having a slot parallel to the slot in the post, a frame member having a long flat body portion, one end of which is hinged in the slot on the post and the other end of which is adjustably positioned in the slot in the column, a motor mounted on the frame member, a piston rod connected to the motor to be driven in reciprocation thereby, said piston rod extending through the guideway and carrying a tuning piston at its inner end.

5. An electrical resonator chamber having a motor-driven tuner, a motor connected in driving relation thereto and means for supporting said motor on the exterior of the chamber to permit its adjustment toward or away from the chamber while minimizing tendency of deflection of the motor from a predetermined position comprising a frame member on which the motor is directly mounted, said frame member having a central body comprising a broad flat plate extending parallel in its width direction to the direction from the motor to the chamber to reduce deflection in that direction, a post mounted on the chamber and having a hinge connection to one end of the frame, a broad column mounted on the chamber and provided with an adjustable supporting connection for the other end of the frame, the column having a wide flat central web extending in a plane perpendicular to the principal plane of the frame member plate to reduce any tendency of the frame member to buckle sidewise.

CARL P. CARLSON.
ROY W. CHESNUT.
ALFRED D. KNOWLTON.

REFERENCES CITED

The following references are of record in the file of this patent:

UNITED STATES PATENTS

| Number | Name | Date |
|---|---|---|
| 1,372,770 | Kimble | Mar. 29, 1921 |
| 2,218,223 | Usselman et al. | Oct. 15, 1940 |
| 2,405,277 | Thompson | Aug. 6, 1946 |